Patented Oct. 11, 1949

2,484,502

UNITED STATES PATENT OFFICE 2,484,502

HALOGENATION OF POLYVINYL ALCOHOL COMPOUNDS

Hugh J. Hagemeyer, Jr., Kingsport, Tenn., assignor to Eastman Kodak Company, Rochester, N. Y., a corporation of New Jersey No Drawing. Application November 26, 1947, Serial No. 788,322

6 Claims. (Cl. 260—91.3)

This invention relates to a process for replacing hydroxyl groups of organic hydroxy compounds by halogen atoms.

It is known that polyvinyl alcohol or its partial esters can be chlorinated directly by passing chlorine gas into a reaction vessel containing the polyvinyl alcohol. Wood in U. S. Patent 2,342,175, dated February 22, 1944, has shown the preparation of such chlorinated polyvinyl alcohols. These products are obtained in white, fine granular form and are marked by their ready solubility in water.

I have now found that polyvinyl alcohol, or other organic compounds containing free alcoholic hydroxyl groups, can be halogenated by treatment with an anhydrous hydrogen halide in the presence of a cyanide or nitrile. In contradistinction to the chlorinated polyvinyl alcohol prepared in the manner described in the prior art, the polyvinyl alcohol chlorinated by my process is insoluble in water and can be precipitated therefrom. This marked difference in solubilities is best explained by an actual reduction in the number of available hydroxyl groups in the polymeric alcohol treated according to my process. A halogen atom replaces a hydroxyl group in the present process, while in the direct chlorination of polyvinyl alcohol with chlorine, an addition apparently occurs (Ellis, "The Chemistry of Synthetic Resins" (1935) page 1056). The replacement of a hydroxyl group by a halogen atom on the one hand, and the addition of chlorine to a hydroxyl-containing-substance on the other, have a noticeable effect on the physical and chemical properties of the resulting compounds.

It is therefore an object of my invention to provide a process for replacing hydroxyl groups of organic hydroxy compounds by halogen atoms. A further object of my invention is to provide a process for replacing hydroxyl groups in polymeric hydroxy compounds by halogen atoms. At still further object of my invention is to provide a process for the preparation of new polymers which are useful in the preparation of films, foils, fibers, or molded articles. Other objects will become apparent from a consideration of the following description:

According to the process of my invention, the organic compound containing at least one free alcoholic hydroxyl or OH group is reacted with an anhydrous hydrogen halide in the presence of a cyanide or nitrile.

The cyanides or nitriles which I can use can be represented by the formula:

R—CN wherein R represents a member selected from the group consisting of a hydrogen atom and an alkyl group, such as methyl, ethyl, n-propyl, isopropyl, n-butyl, and isobutyl (i. e. an alkyl group having the formula $C_nH_{2n+1}$ wherein $n$ is a positive integer from 1 to 4). Typical are hydrogen cyanide (HCN), acetonitrile, propiononitrile, n-butyronitrile, isobutyronitrile, n-valeronitrile and isovaleronitrile. Other nitriles, such as benzonitrile (phenyl cyanide), phenylacetonitrile, etc. can be used, however, there is ordinarily no advantage in using them.

When the organic hydroxy compound reacts with the anhydrous hydrogen halide in the presence of a cyanide or nitrile in accordance with the process of my invention, the following reaction takes place:

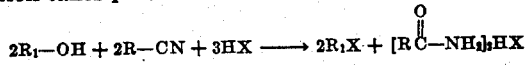

wherein $R_1$ is the residue of the organic hydroxy compound and X is a halogen atom, e. g. chlorine, bromine, or iodine. Artificial cooling means are employed while the hydrogen halide is being passed into the reaction mixture to dissipate the heat of reaction. At temperatures of from 40–150° C., the desired organic halide readily forms. Higher temperatures can be used but no advantage usualy results.

The organic hydroxy compounds which I can use are polyvinyl alcohol, partially hydrolyzed esters of polyvinyl alcohol (e. g. polyvinyl acetate, polyvinyl propionate, polyvinyl butyrate, polyvinyl isobutyrate, etc.), polyisopropenyl alcohol, partially hydrolyzed esters of polyisopropenyl alcohol, alkyl alcohols (e. g. methyl, ethyl, n-propyl, isopropyl, n-butyl, isobutyl, sec-butyl, tertiary butyl, amyl alcohols, etc.) glycols (e. g. ethylene glycol, diethylene glycol, polyethylene glycols, propylene glycol, etc.), partially etherified or esterified glycols (e. g. β-ethoxyethanol, β-butoxyethanol, ethylene glycol monoacetate, etc.), hydroxy acid esters (e. g. methyl lactate, ethyl lactate, n-propyl lactate, methyl glycollate, ethyl glycollate, etc.), and cellulose ethers and esters. Advantageously I can use organic compounds containing an alcoholic hydroxyl group wherein the hydroxyl group is attached to a carbon atom having bonded thereto at least one hydrogen atom (i. e. primary and secondary alcohols).

Inert solvents or diluents, such as 1,4-dioxane, benzene, toluene, ethylene dichloride, etc., can be used if desired. Advantageously I can use a large excess of the nitrile or cyanide since it not only serves as a very useful solvent for the modified product, but also serves to reduce the corrosive effects of the hydrogen halide present. The inert solvents can be used to partially replace the excess of nitrile, if desired.

It is known that the hydrochlorides of iminoethers can be prepared by reacting an organic hydroxy compound (e. g. ethyl alcohol) with a nitrile in the presence of hydrochloric acid.

However, the temperatures at which this reaction is carried out are low (approximately 0° C.). In my process, however, I allow the temperature to rise to 40–60° C., or as high as 150° C., and at these temperatures the desired organic halides are formed. It is, therefore, important that the temperature in my process be allowed to rise to 40–150° C. Advantageously I can first react the nitrile or cyanide with the anhydrous hydrogen halide while cooling the reaction mixture to about 0° C., and then add the organic hydroxy compound and allow the temperature to rise to 40–150° C. Another method consists in suspending the organic hydroxy compound in the nitrile or cyanide, with or without an inert solvent, and then passing in a dry hydrogen halide while the temperature is maintained at 40–150° C. by cooling.

When polyvinyl alcohol is the hydroxy organic compound the reaction can be illustrated as follows:

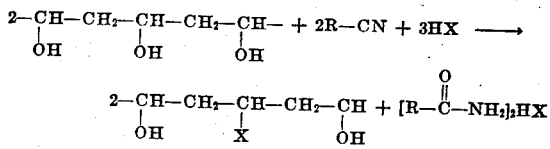

wherein X is a halogen atom, e. g. chlorine, bromine, or iodine. When a partially hydrolyzed vinyl acetate is employed, the reaction is:

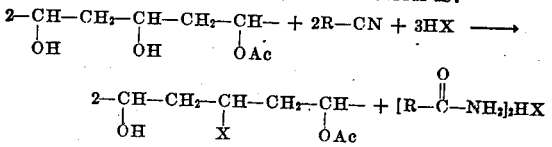

In the above equation R has the above designated definition, X represents a halogen atom (e. g. chlorine, bromine, or iodine) and Ac stands for the acetyl radical

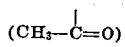

The organic hydroxy compounds which I use are compounds wherein the hydroxyl or OH group is an alcoholic hydroxyl group (i. e. phenols do not come within the scope of my invention). Advantageously the organic hydroxy compounds which I can use are the aliphatic organic compounds containing an alcoholic hydroxyl group, although such alcohols as benzyl alcohol can be used.

The following examples will serve to characterize my invention further.

*Example I*

20 g. of polyvinyl alcohol were suspended in 200 cc. of propiononitrile. Anhydrous hydrogen chloride gas was then introduced into the reaction mixture through a hollow, high-speed stirrer, while the temperature of the contents of the vessel was maintained at about 50° C. by cooling. As the reaction progressed, the chlorinated polyvinyl alcohol dissolved in the excess propiononitrile while the propionamide hydrochloride formed precipitated out. The supernatant liquid of the reaction mixture was then poured into distilled water and a fine precipitate of chlorinated polyvinyl alcohol was obtained. It was purified by redissolving in propiononitrile and precipitating in distilled water. The chlorine content of the polymer was found by analysis to be 7.1%. A dope was prepared by dissolving the polymer in acetone and adding 2% by weight of lead naphthenate. When this dope was coated onto a metal plate, a clear, tough, flexible skin was obtained.

By substituting partially hydrolyzed polyvinyl acetate and anhydrous hydrogen bromide in the above example, a brominated polymer having the characteristic structure:

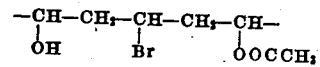

can be obtained.

*Example II*

20 g. of polyvinyl alcohol were suspended in 200 cc. of acetonitrile. Anhydrous hydrogen chloride gas was then passed into the reaction mixture through a hollow, high-speed stirrer, while the temperature of the contents of the reaction vessel was maintained at 50–60° C. As the hydrogen chloride gas was passed in, a fine precipitate of acetamide hydrochloride appeared, and when the precipitate no longer came down, the addition of hydrogen chloride was discontinued and the supernatant reaction liquor poured off into distilled water. The chlorinated polyvinyl alcohol was obtained as a fine precipitate. An acetone dope of this polymer was prepared as in Example I, and this acetone dope when coated on metal sheets gave a tough, clear film having a chlorine content by analysis of 4.3%. This film was somewhat softer than that obtained in Example I, although it proved to be exceedingly strong and tear-resistant.

*Example III*

20 g. of polyvinyl alcohol were suspended in 200 cc. of propionitrile and dry hydrogen chloride gas slowly passed into the mixture through a hollow, high-speed stirrer over a period of six hours, while the temperature was maintained at approximately 60° C. The supernatant reaction liquor was decanted off from precipitated propionamide hydrochloride into distilled water, where a fine precipitate was obtained. An acetone dope was prepared by dissolving the polymer in acetone and adding 2% by weight of lead naphthenate. When this dope was coated onto metal plates, a tough, hard film, which contained by analysis 7.7% of chlorine, was obtained.

When a molecularly equivalent amount of polyisopropenyl alcohol, partially hydrolyzed polyvinyl propionate or butyrate is substituted in the above example, other chlorinated copolymers can be prepared. A particular advantage of my process is that initially water soluble polymeric compounds can be rendered water-insoluble. when treated according to the above described process. The analogous chlorinated products of the prior art on the other hand are water soluble, and do not possess the usefulness in preparing adhesives, lacquers, coating of paper, preparation of films, foils, fibers, molded articles, etc., as do the products of my invention. The products prepared above can be further modified by the condensation with aldehydes to produce acetals, by reaction with amines, isocyanates, alkylene oxides, and the like.

*Example IV*

Anhydrous hydrogen chloride was passed into a mixture of 100 cc. of acetonitrile and 100 cc. of anhydrous ethyl alcohol until a total of 20 g. of hydrogen chloride had been added. The mixture was refluxed for 1 to 2 hours, and the supernatant reaction liquor was separated from the precipitated acetamide hydrochloride formed. When this liquor was fractionally distilled, 14 g. of ethyl chloride was obtained, representing a yield of 50%.

By substituting molecularly equivalent amounts of isopropanol, n-butanol, isobutanol, etc. in the above example, other alkyl chlorides can be prepared.

*Example V*

Anhydrous hydrogen chloride was passed into a mixture of 100 cc. acetonitrile and 100 cc. of n-propanol, while the vigorous heat of reaction was dissipated by cooling the reaction mixture to about 50–55° C. After one hour the addition of hydrogen chloride was discontinued, and the reaction liquor decanted from the copious precipitate of acetamide hydrochloride. The reaction liquid was then fractionally distilled, and 85 cc. of n-propyl chloride boiling at 46° C. were obtained.

By substituting molecularly equivalent amounts of other hydroxy compounds such as methyl lactate, ethyl glycollate, ethylene glycol, etc., in the above example, other halides can be prepared.

*Example VI*

20 g. of cellulose acetate having an acetyl content of 34.7% were dissolved in 100 cc. of acetonitrile, and dry hydrogen chloride gas was passed in until a total of 10 g. had been added. The reaction was exothermic and the solution was maintained at 40–45° C. by cooling. Acetamide hydrochloride was filtered off and the filtrate was diluted with an equal volume of acetic acid containing 10 g. of sodium bicarbonate. The mixture was again filtered, and the filtrate poured into a mixture of naphtha (B. P. 90–110° C.) and methanol. A fine precipitate of cellulose diacetate chloride having a chlorine content by analysis of 4.02% was obtained. A dope was prepared by dissolving the cellulose diacetate chloride in a 50:50 solution of acetone and methanol, and a skin coated from this dope was found to be very hard and brittle.

*Example VII*

Anhydrous hydrogen iodide was passed into a mixture of 100 cc. of absolute ethyl alcohol and 100 cc. of acetonitrile until a total of 70 g. of hydrogen iodide had been added. The temperature was maintained at 50–65° C. during the addition of hydrogen iodide by cooling. The reaction mixture was then heated at 50–65° C. for two hours after the addition of hydrogen iodide was complete, and the supernatant liquid separated from the hydrogen iodide addition salt of the formed acetamide. Upon fractional distillation of the supernatant liquid, 76 g. of ethyl iodide was obtained.

By substituting a molecularly equivalent amount of polyvinyl alcohol in the above example, a polymer having the characteristic structure:

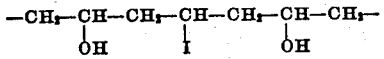

can be obtained. Similarly, partially hydrolyzed polyvinyl acetate yields the polymer:

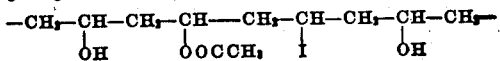

*Example VIII*

Anhydrous hydrogen bromide was passed into a mixture of 100 cc. of anhydrous isopropanol and 100 cc. of acetonitrile until a total of 40 g. of hydrogen bromide had been added. During the addition of the hydrogen bromide the temperature slowly rose to 65° C., but the temperature was not allowed to rise above 65° C., cooling means being employed when necessary. The reaction mixture was then heated at 65–70° C. for one hour, and then filtered to remove the hydrogen bromide addition salt of the formed acetamide. Upon fractionation of the filtrate, 47 grams of isopropyl bromide boiling at 59–60° C. were obtained.

When a molecularly equivalent amount of polyvinyl alcohol replaces isopropyl alcohol in the above example, the polymer:

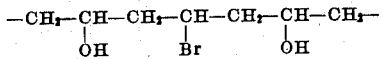

can be obtained. Similarly, when a molecularly equivalent amount of ethyl lactate is employed in the above example, ethyl α-bromopropionate is obtained.

I claim:

1. A process for replacing a hydroxyl group of a polyvinyl compound containing polyvinyl alcohol hydroxyl groups by a halogen atom, which comprises reacting said compound with a member selected from the group consisting of anhydrous hydrogen chloride, anhydrous hydrogen bromide, and anhydrous hydrogen iodide in the presence of a nitrile having the formula:

wherein R represents a member selected from the group consisting of a hydrogen atom and an alkyl group of the formula $C_nH_{2n+1}$ wherein $n$ is a positive integer from 1 to 4 at a temperature of 40–150° C.

2. A process for replacing a hydroxyl group of polyvinyl alcohol by a chlorine atom which comprises reacting polyvinyl alcohol with anhydrous hydrogen chloride in the presence of acetonitrile at a temperature of 40–60° C.

3. A process for replacing a hydroxyl group of polyvinyl alcohol by a chlorine atom which comprises reacting polyvinyl alcohol with anhydrous hydrogen chloride in the presence of propiononitrile at a temperature of 40–60° C.

4. The products prepared by the process of claim 1.

5. The products prepared by the process of claim 2.

6. A process for replacing a hydroxyl group of polyvinyl alcohol by a chlorine atom which comprises reacting polyvinyl alcohol with anhydrous hydrogen chloride in the presence of a nitrile represented by the formula:

wherein R represents an alkyl group of the formula $C_nH_{2n+1}$ wherein $n$ is a positive integer from 1 to 4, at a temperature of 40–60° C.

HUGH J. HAGEMEYER, JR.

REFERENCES CITED

The following references are of record in the file of this patent:

Taylor and Baker, Sidgwick's Organic Chemistry of Nitrogen (1937), page 154.

Pinner, Berichte, vol. 16, pp. 1643–1655 (1883).